United States Patent [19]

Schwartz et al.

[11] Patent Number: 5,903,642
[45] Date of Patent: May 11, 1999

[54] METHOD FOR ELIMINATING TELEPHONE HOLD TIME

[75] Inventors: Fred J. Schwartz; Steven H. Bazerman, both of New York, N.Y.

[73] Assignee: Call-A-Guide, Inc., New York, N.Y.

[21] Appl. No.: 08/937,647

[22] Filed: Sep. 24, 1997

[51] Int. Cl.$^6$ .............................. H04M 3/00; H04M 3/42; H04M 3/50; H04Q 3/64
[52] U.S. Cl. ............................................. 379/309; 379/209
[58] Field of Search ................................... 379/209, 214, 379/265, 266, 309

[56] References Cited

U.S. PATENT DOCUMENTS

| | | | |
|---|---|---|---|
| 3,542,965 | 11/1970 | Wilkens, Jr. . | |
| 5,040,208 | 8/1991 | Jolissaint | 379/209 |
| 5,155,761 | 10/1992 | Hammond | 379/67 |
| 5,181,236 | 1/1993 | LaVallee et al. | 379/67 |
| 5,185,782 | 2/1993 | Srinivasan | 379/67 |
| 5,185,786 | 2/1993 | Zwick | 379/201 |
| 5,249,221 | 9/1993 | Ketring | 379/214 |
| 5,253,288 | 10/1993 | Frey et al. | 379/221 |
| 5,311,574 | 5/1994 | Livanos | 379/88 |
| 5,311,583 | 5/1994 | Friedes et al. | 379/209 |
| 5,436,967 | 7/1995 | Hanson | 379/266 |
| 5,537,470 | 7/1996 | Lee | 379/266 |
| 5,625,682 | 4/1997 | Gray et al. | 379/266 |
| 5,627,884 | 5/1997 | Williams et al. | 379/88 |
| 5,646,988 | 7/1997 | Hikawa | 379/266 |

*Primary Examiner*—Harry S. Hong
*Attorney, Agent, or Firm*—Bazerman & Drangel, PC

[57] ABSTRACT

A method, which may be carried through a computer and its modem, is used to minimize the telephone time necessary to establish direct voice contact with the computer technician or other service provider and to provide information to the technician about the computer system and program. When contact is made through the modem with the information provider's PBX, the caller's computer would send a signal, indicating whether this is a reconnect or a new contact. If the customer support telephone line is for a number of programs or if there are different queues for different problems, a dialog box can be used to supply the necessary information to select the appropriate queue. The telephone system would provide an indication of the current wait time for the particular product or problem taking into account not only the open lines currently in the queue, but other callers who will be calling back at an appropriate time. The caller will then be informed of length of the wait and that the caller can (1) have the caller's computer automatically call back at the appropriate time without losing the place in line if the caller has a telephone connection to his/her modem; (2) call back on a telephone not connected to the modem with a priority number which will position the caller in the queue, if a caller does not have a handset attached to his/her modem; or (3) continue to hold.

15 Claims, 6 Drawing Sheets

METHOD FOR ELIMINATING TELEPHONE HOLD TIME

BACKGROUND OF THE INVENTION

This invention relates to inbound telephone call processing and, in particular, to a method for automatically processing telephone calls to an information provider, such as computer technical support, to eliminate long hold times and to automatically provide certain information to the information provider prior to direct telephone contact between the caller and the provider.

Information, such as technical support for both computer hardware and software, is provided by telephone calls made by the caller to a technical support or communication center. There are usually long delays in which the caller is held on telephone queue awaiting the availability of a person, such as a computer technician. Depending on the company and its technical support system, this telephone time may be charged by the telephone company either to the support service or the caller. The end result is a substantial charge to one or the other. Since the information provider would not wish the caller be given a busy signal, the information provider must have a large number of lines to be held open while the caller awaits contact with the appropriate person. In addition, in the area of computer technical support, when a technician is finally reached, he must spend a substantial period of time obtaining information about the caller's hardware and software, as well as obtaining diagnostic information which would aid the technician in evaluating the problem.

Typically, hold times for technicians in the computer area are at a minimum on the order of ten to fifteen minutes and sometimes extend far beyond, especially when a new product becomes available to consumers. Busy signals and long hold times effect the caller's attitude to the service provider with a resulting negative impact on future purchases by the caller. Computer magazines frequently present articles concerning customer service which prominently feature the time the caller is kept on hold and recommend purchase based on customer service.

Some attempts have been made to eliminate this problem by use of a system which automatically obtains the caller's telephone number, disconnects and returns the call at the time when the caller would have been serviced had the caller stayed on hold, such as seen in U.S. Pat. Nos. 5,627,884, issued May 6, 1997 to Williams et al.; 5,185,782, issued Feb. 9, 1993 to Srinivasan; 5,155,761, issued Oct. 13, 1992 to Hammond; 5,181,236, issued Jan. 19, 1993 to LaVallee et al.; and 5,185,786, issued Feb. 9, 1993 to Zwick. These systems shift the burden of the payment for the return call to the technical service department since it initiates the return call where the majority of the telephone time will be spent in aiding the caller. Since the trend is for the callers to pay for the telephone time for customer service, if not the service itself, such runs contrary to current practice. Callers also have a distrust of call-backs, in most cases, because the callers do not believe that they will, in fact, have preference over the people who have held on to the phone line and because callers are not aware of their own availability at the time the call back is actually made.

SUMMARY OF THE INVENTION

In the present invention, a method which may be carried out by a computer is used to minimize the telephone time necessary to establish direct voice contact with the computer technician or other service provider and to provide information to the technician about the computer system and program, greatly reducing time charges and the number of lines necessary to maintain a caller's support system. The caller accesses through his modem, technical support for any program by a "technical support" entry in the help menu of the appropriate program. The computer will then dial the number for the appropriate technical support group.

If the line is busy, the computer would continue recalling until a line is available. When contact is made with the information provider's PBX, the caller's computer would send a signal, indicating whether this is a reconnect or a new contact. The caller's PIN or serial number can also be sent at this time. If the customer support telephone line is for a number of programs or if there are different queues for different problems, a dialog box can be used to supply the necessary information to select the appropriate queue. Such dialog boxes can be uploaded to the support telephone system or be retained in the program itself. The telephone system would provide an indication of the current wait time for the particular product or problem taking into account not only the open lines currently in the queue, but other callers who will be calling back at an appropriate time. The caller will then be informed of length of the wait and that the caller can (1) have the caller's computer automatically call back at the appropriate time without losing the place in line if the caller has a telephone connection to his/her modem; (2) call back on a telephone not connected to the modem with a priority number which will position the caller in the queue, if a caller does not have a handset attached to his/her modem; or (3) continue to hold. If the information provider desires, it can eliminate or limit the third option to a maximum hold period.

If the caller elects to remain on line, the program performs no further function with regard to hold time but merely supplies information concerning the caller's hardware and software to the information provider at the appropriate time. If the caller wishes to call back, either through the computer or manually, the caller so indicates through the modem. The PBX then generates a priority code corresponding to the place in line which is supplied to the caller's computer through its modem. It should be encrypted in order to not allow the position in line to be hacked to give a preference to the more advanced programmers. Alternatively, if a PIN or serial number was supplied by the program, the place in the queue could be maintained by the PBX or an attached computer which could recognize the caller by its PIN or serial number.

Subsequent computer calls ("call back" or "reconnect") may be to a different number than the initially contacted number. This phone number can be supplied at the same time as the information as to place in line is forwarded to the caller's computer. The program then breaks the telephone connection.

At the call-back time, the computer generates a dialog box asking the caller if the caller wishes the computer to dial back or the caller wishes to call back manually. There can also be an audible signal. If the caller is still at the computer but is busy, the caller can initiate the snooze function and be reminded again ten or fifteen minutes later so the caller would not have to break, for example, an Internet connection. When the caller indicates that he is ready for the phone call and he/she wishes the computer to place it, the program will then place the phone call to the appropriate number and when answered by the customer service telephone number will supply its encrypted position in line, a PIN or serial number, or all three. At this point, the caller will be properly positioned in the queue for voice and data connections.

If at this time the initial estimate was incorrect and it appears that there will be an extended wait, the PBX computer can so inform the caller's computer and a dialog box could appear indicating the appropriate time of the wait and if the caller wishes to call back, as in the start of the process.

If the second option is selected, the caller calls back on a phone not connected to the modem and during the initial message enters his/her priority code by means of the phone's key pad. The customer support system will use the number to properly position the call in the queue. In either case, the priority code will have a limited life of a few hours to prevent abuse of the system.

In order to aid the technician and eliminate the time normally spent in questioning the caller about his/her system, the modem can forward information it obtains from the computer and its software itself, such as the identity of the caller, e-mail address, telephone numbers, the identified CPU, the amount of RAM, other programs, conflicts, diagnostic information, etc., which can be displayed on the technician's screen before or at the time the technician commences voice communication. Additional information on a particular problem can also be gathered through one or more menus which can be sent to the technical support personnel immediately before voice communication is commenced.

DETAILED DESCRIPTION OF THE PREFERRED EMBODIMENT

Figure 1:
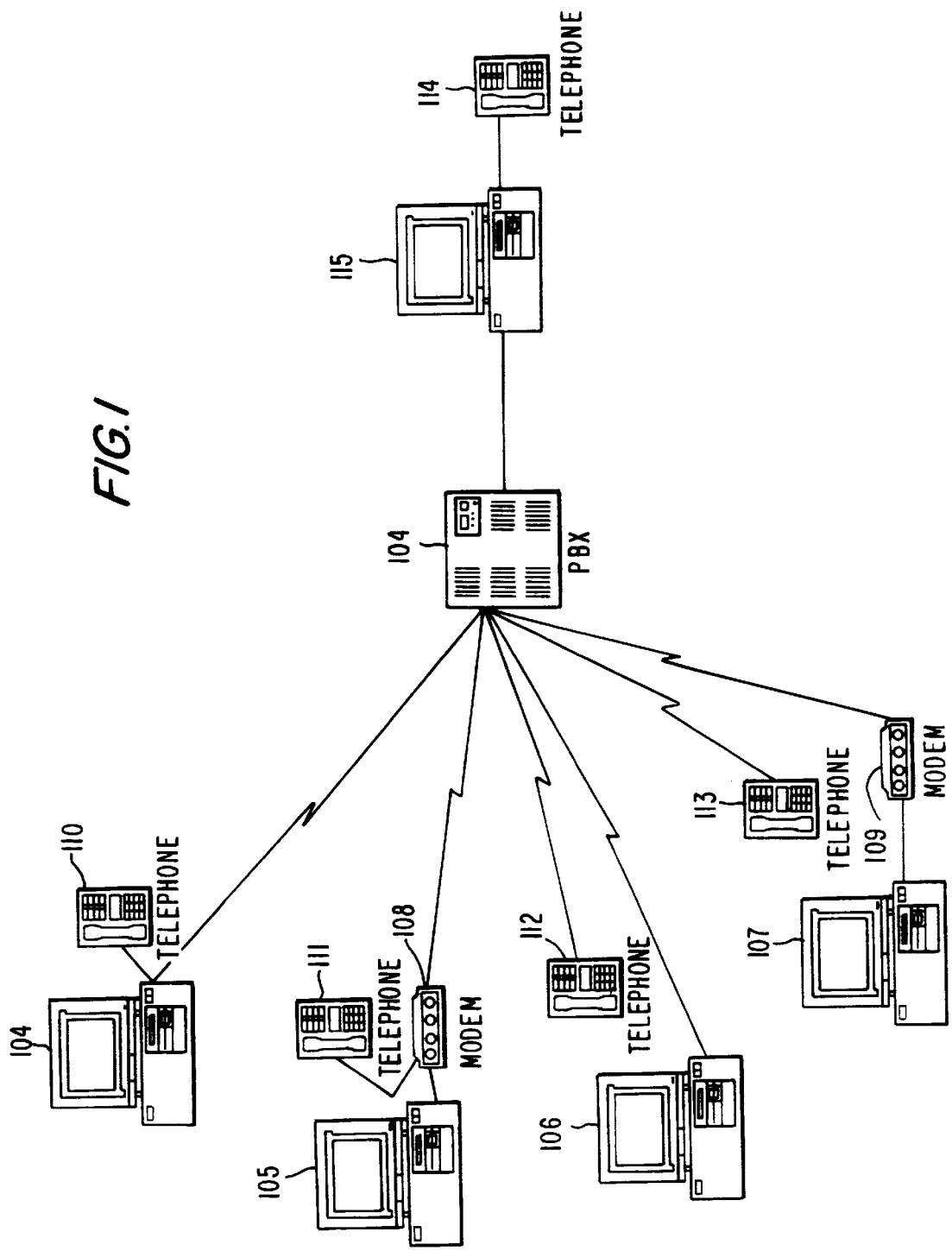
FIG. 1 is a block diagram of a hold time savings system in accordance with the present invention.
Figure 2:
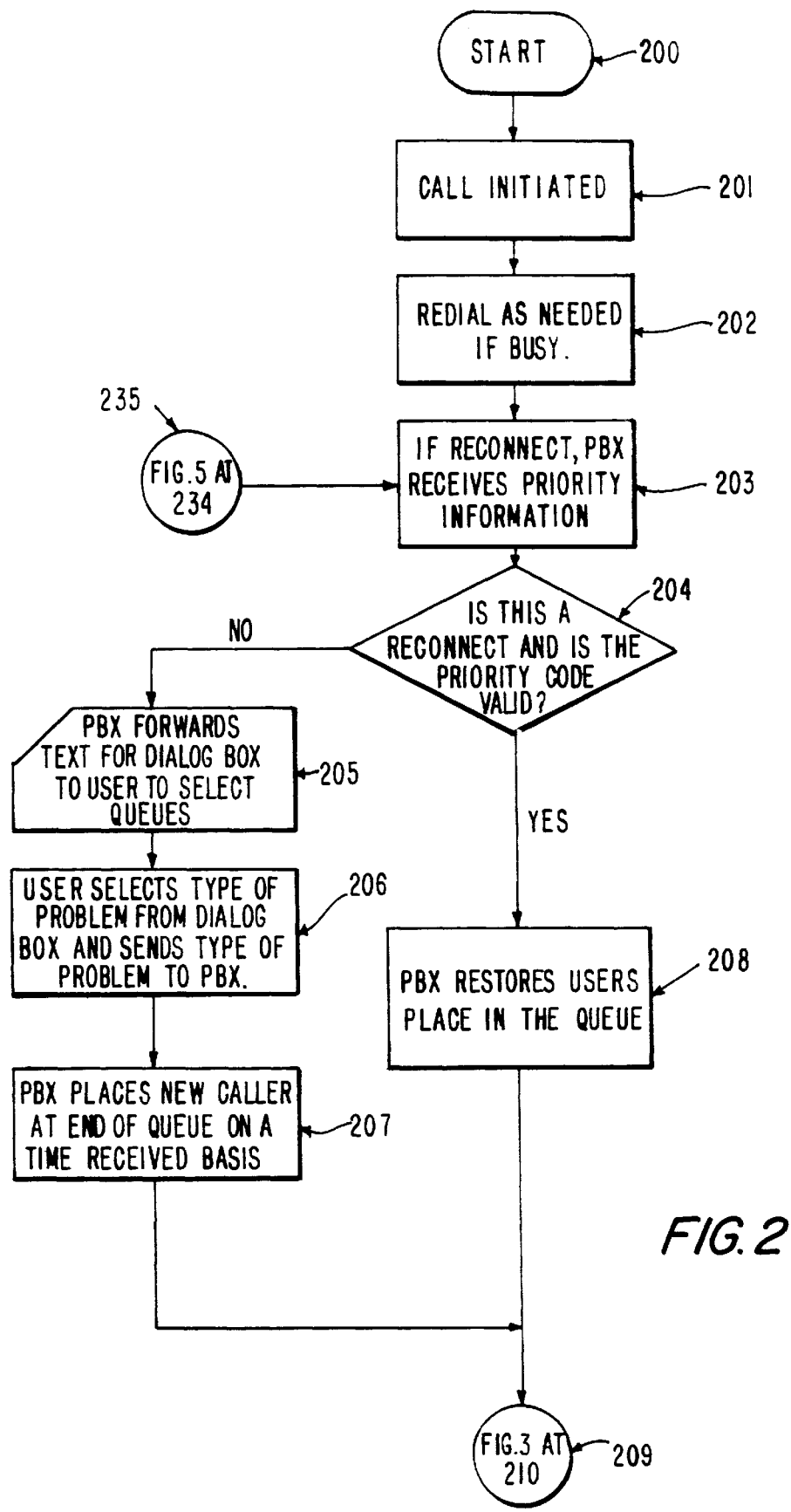
FIGS. 2–6 are a flow chart of the steps taken by the caller in the present method.

FIG. 1 illustrates a typical configuration. The callers of the method are contacting an information provider, such as technical support service for a computer program by initiating a call through the respective computers 104 through 107. Computer 104 has a telephone handset 110 attached to its internal modem (not shown). Computer 105 has en external modem 108 to which is attached telephone handset 111. Similarly, computer 106 has an internal modem (not shown) and computer 107 an external modem 109. Telephone handsets 110 and 111 are attached to the modem for their computer 106 and 107. Telephone handsets 112 and 113 are not attached to their respective modems, but are directly attached to the telephone systems without connection through the computer 106 or modem 109.

The present invention relates to a method to contact the appropriate technician and maintain the position in the queue without the necessity of holding the telephone line open. The technician would normally have a computer 115 with an internal modem, not shown. Telephone handset 114 is attached to the PBX 140 through the technician's modem.

As shown in the flow diagram of FIGS. 2–5, once a caller makes the determination to contact technical support or other information provider 200, the caller, through his/her computer 104–107 initiates the contact 201. How the caller initiates the software to contact the technical support service or other information provider PBX 140 depends on the operating system of the computer and the nature of the program itself. For example, if the operating system is Windows 95, one can initiate the program by having an icon on the desktop, by having an option in a help menu or in the start menu for the program to be supported or there can be a single program which offers support for a number of different technical support lines. Once the program is initiated, a computer 104–107 will continually dial the appropriate technical support service using a telephone number which is incorporated in the program 202. Once contact is made with the technical support PBX 140, the caller's computer can exchange information with the PBX 140 or a support computer which is connected to the PBX 140 (not shown). If this is a call back (reconnect) after a previous contact with regard to the same problem, the caller's computer 104–107 can supply a priority number, PIN number or serial number 203 which will be used to properly position the telephone call in the appropriate queue 208. It may also be useful, to stop abuse of the system, to give the priority code a limited life so that if the caller does not call back within the prescribed time period the PBX would refuse the priority and/or the caller's computer will cease offering to contact the PBX to accomplish this. The priority number can be reviewed to see if it is valid and within acceptable time limits for reconnect 204. If not, it can be treated as an initial contact. If this is the initial contact with regard to this problem and there are multiple queues, the PBX 140 can forward the text for a dialog box to determine which queues is appropriate 205. The caller will respond and forward to the PBX 140 the requested information 206. If this is a reconnect but the priority code is invalid or outside the time limit, the screen can so inform the caller and indicate that he/she will be treated as a new caller. The new caller will then be positioned at the end of the appropriate queue on a time received basis 207. Flow chart items 209 and 210 show the interconnection of the flow diagram of FIG. 2 and FIG. 3.

Thus, the call is positioned on the queue depending either on reconnect priority information or if a new caller, on the basis of the time the phone call was received. The PBX 140, or a computer working in conjunction with the PBX 140 (not shown) calculates the approximate wait time to the caller, based on the average length of call, the number of calls holding and the priorities previously issued which will come back on line prior to the caller coming into contact with the technical service computer 211 and so informs the caller. At this point, the PBX queries the caller as to whether to hold or disconnect and redial after the approximate wait time 212. If the calculated approximate wait time is more than a certain amount, the PBX 140 or related computer can eliminate the alternative of holding and require the caller to call back in accordance with the calculated wait time. If the caller chooses to hold and the technician is available within a set time period 213, the caller's computer can forward information 214 directly to the technician's computer 115 through PBX 140. Such information may include the hardware contained in the caller's computer, the software, conflicts, diagnostic information, such as Dr. Watson®, which information can be gathered from the caller's computer 214 by the program either during set up of the program and/or at the time the program is initiated. This information would be displayed on computer 115 and voice contact established between the caller and the technician 216. If the callers 104, 105 and the technicians'computers 115 have the capacity for simultaneous transmission of data and voice, they can be transmitted simultaneously. The data channel can then also be left open for transmission of diagnostics and other information during and simultaneously with the vocal communications.

If, however, the support service does not pick up within a set time 213, the PBX recalculates the wait time and transmits it to the caller 211. Again the caller is given the option of holding or reconnecting at the new estimated time 212.

Figure 3:
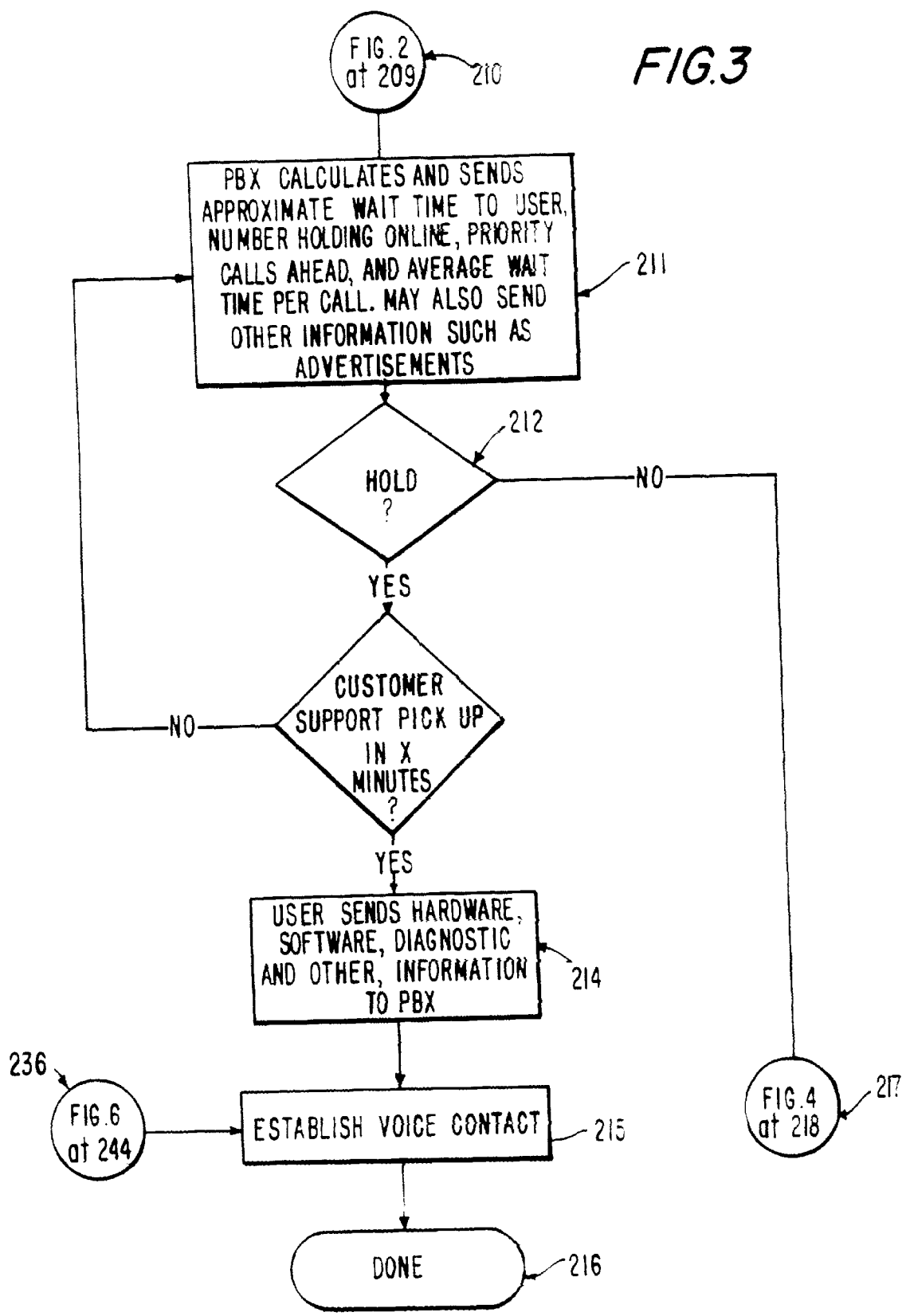
Figure 4:
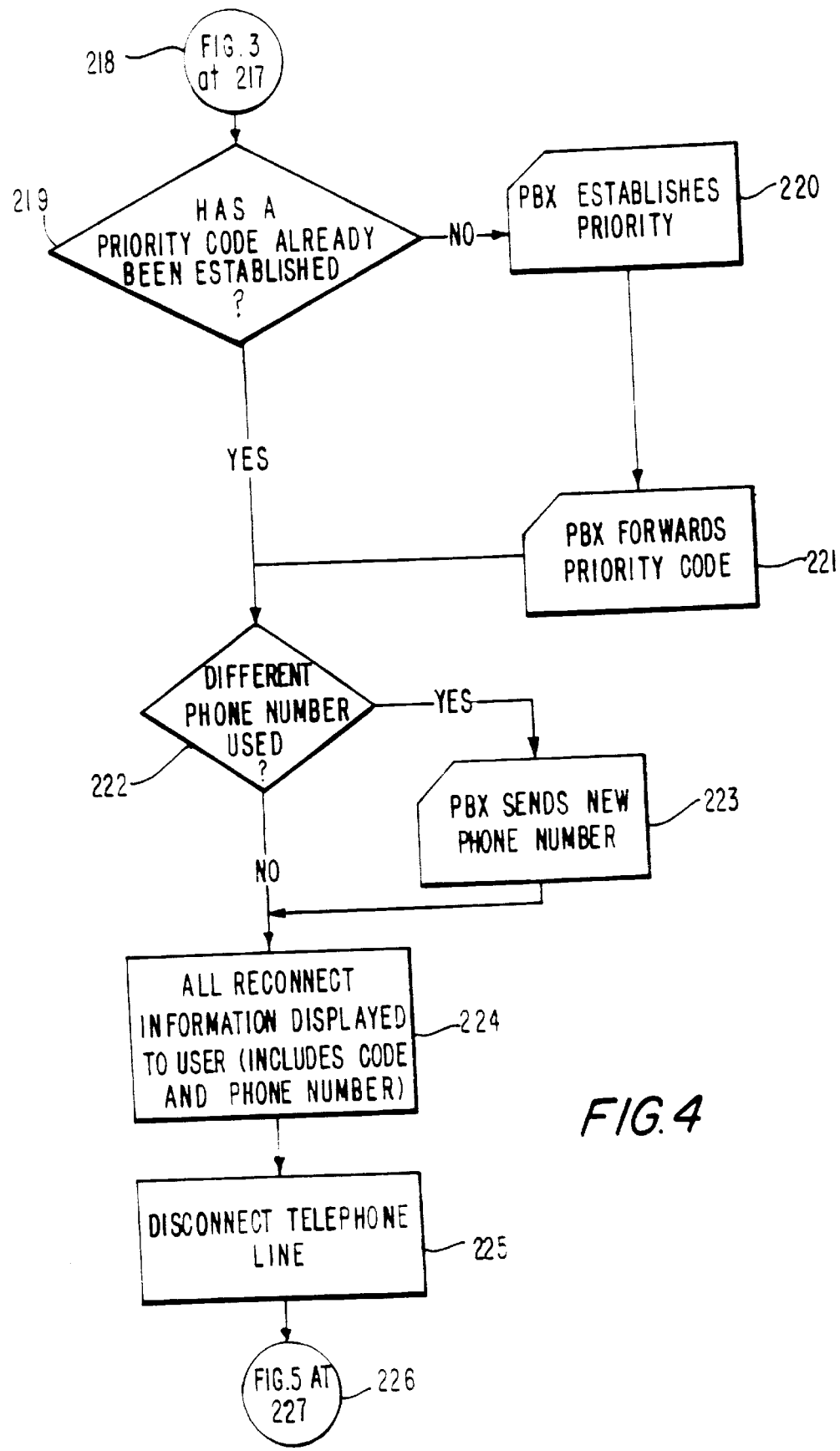

Flow chart items 217, 218 show the interconnection between the flow chart of FIG. 3 and FIG. 4. If a decision is either made by the caller or the computer that the caller should not hold and the call is not a reconnect with a priority code already established 219, the PBX establishes the caller's priority 220 and forwards it 221 to the caller's computers 104–107. If the technical service department desires to have the caller call back at a different phone number 222, it can forward such new phone number 223 to the caller's computer 104–107. Such alternate phone number might be useful to direct calls to specific problems, to use a local service centers, or to allow the use of an "800" number for the initial contact and normal area code dialing for the actual support. The reconnect information is displayed on the caller's computer 104–107, including number information and priority code 224. The caller's computer then automatically disconnects the telephone line 225. Instead of basing the positioning in the queue on the use of a priority code, the caller's computer can supply its PIN number or serial number to the PBX 140 or its associated computer and the queue can be maintained by the PBX 140 or associated computer.

Figure 5:
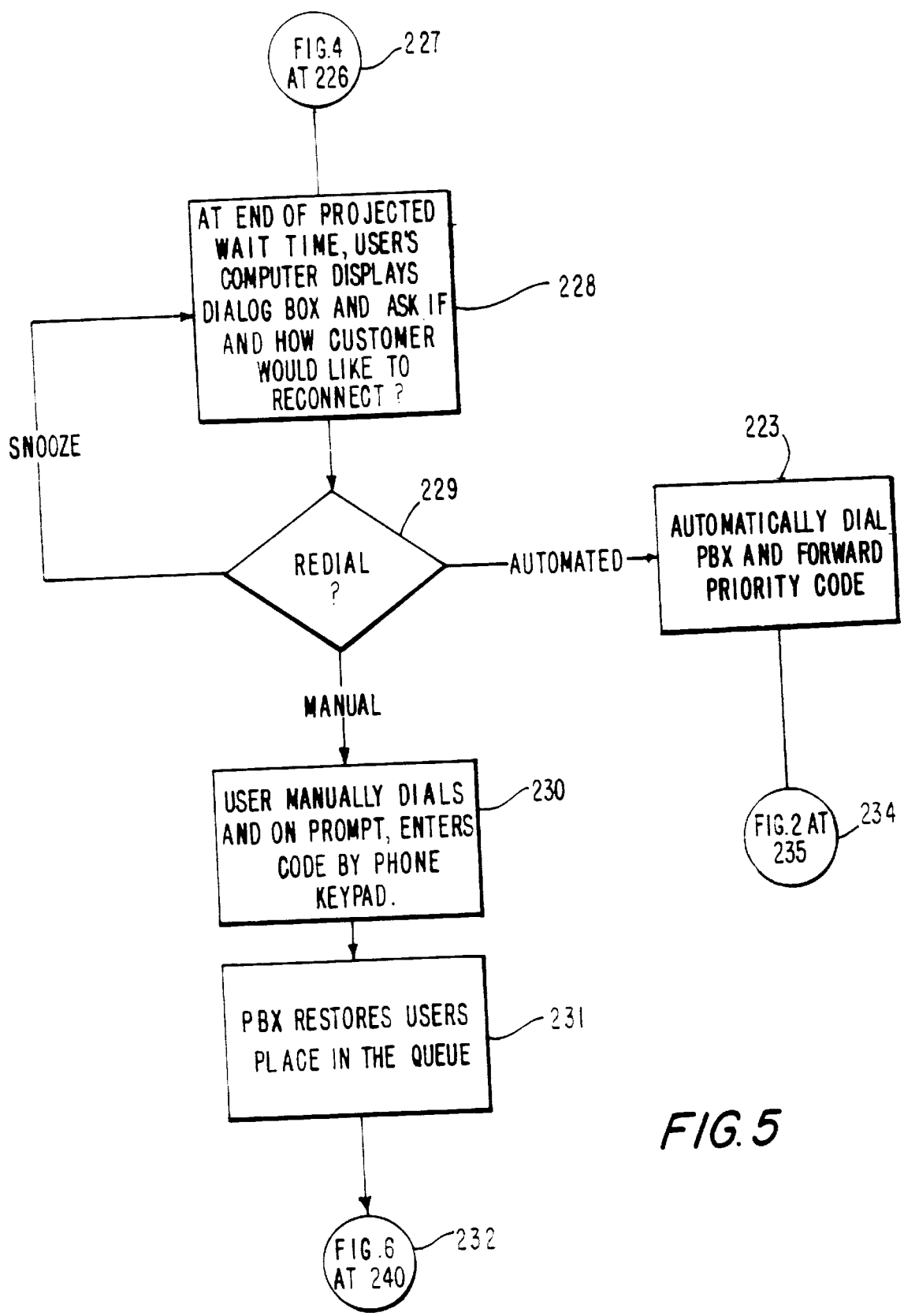
Figure 6:
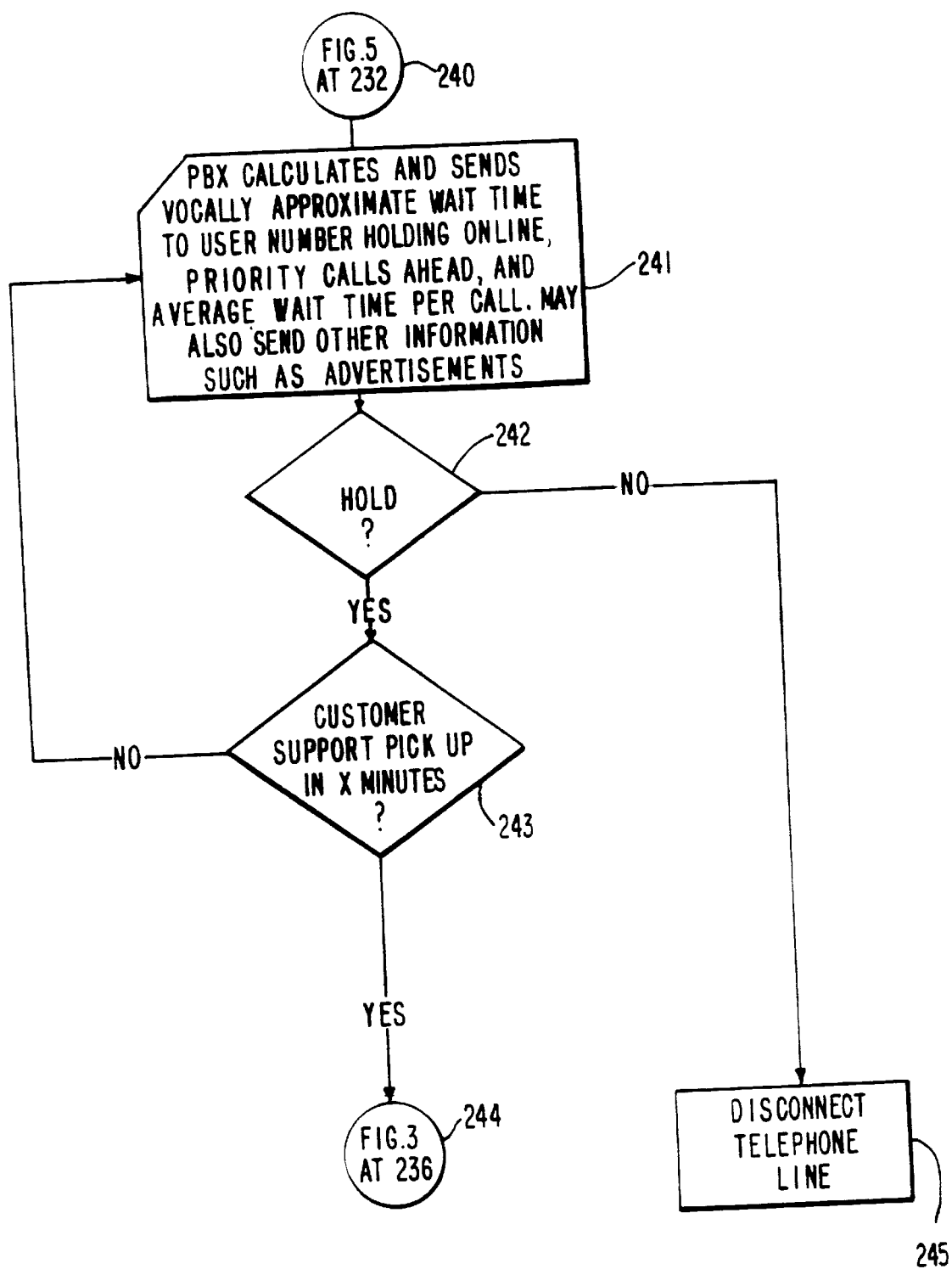

Flow chart items 227,232 and 234, show the interconnection of the flow chart of FIG. 5 with the other figures. Where the calderas disconnected from the PBX, the caller's computer 104–107 will, at the end of the wait time, initiate a dialog box to ascertain how the caller would like to reconnect 228. The screen can display phone numbers and priority code. The caller would be given three options 229, automated response, manual response or to snooze. If snooze is selected, the same dialog reappears after a set period of time. If automated response is indicated, the program automatically dials the PBX 140 and forwards the priority code 223 and then reconnects 234 to the program at step 209 as seen in FIGS. 5 and 6. If manual is selected, the caller manually dials the number displayed on the screen and on the prompt enters the priority code displayed by means of the key pad 230 and the caller is redirected to his place in the queue 231. Since the contact is by direct phone contact rather than through the modem, the manual caller will be unable to send the hardware, diagnostic and other information to the PBX 140. Just as a caller of automated reconnect is informed of his place in line by dialog boxes, automated verbal information may be supplied to the caller 241, who can have the option of terminating the call and reconnecting at a later time using the same priority code or holding 242, 236, 245. If the caller decides to hold, his wait time can be constantly updated 243.

While holding, advertisements can be forwarded to the caller's computer or the caller's handset depending on whether the call is made through the modem or not.

While the present invention is discussed in terms of computer technical support, the invention is equally applicable to any contact where there is a large number of callers or customers and the party to be contacted has a limited number of persons to respond such as would occur when a person is attempting to contact a government agency, customer ordering departments, customer complaint departments and the like. Equally, while the invention has been discussed in terms of using a priority number generated by the PBX, the software's own PIN or serial number may be used and the PBX maintain the queue, as discussed above. If priority codes are used, they should be encrypted such as to make it difficult or impossible for the caller to obtain a higher priority than the caller is entitled.

It is understood that the present embodiment described above is to be considered as illustrative and not restrictive. It will be obvious to those skilled in the art to make various changes, alterations and modifications to the invention described herein. To the extent that these variations, modifications and alterations depart from the scope and spirit of the appended claims, they are intended to be encompassed therein.

We claim:

1. The method of prioritizing incoming calls and arranging for such incoming calls to be connected to a receiving party for voice contact at a later time, consisting of the steps of:
   a. the caller temporarily establishing a communication connection with the receiving party;
   b. automatically establishing a priority code, if the incoming call does not already have a priority code;
   c. automatically establishing a place on the queue of incoming callers based on the priority code;
   d. automatically establish a time to reconnect;
   e. forwarding to the caller said established time to reconnect and, if not previously supplied, a priority code to the caller;
   f. breaking the communication connection; and
   g. automatically reminding the caller of the time for the caller to initiate reconnection to the receiving party.

2. The method of prioritizing incoming calls according to claim 1 wherein the caller calls back and is reconnected at the time established for reconnection, supplies a priority code and is placed in proper position in queue based on the caller's priority code.

3. The method of claim 2 wherein the caller is automatically reconnected and the priority code is automatically supplied to the receiving party.

4. The method of prioritizing incoming calls according to claim 1 wherein said priority code is automatically calculated from the time that the caller first establishes the temporary communication connection.

5. The method of prioritizing incoming calls according to claim 4 wherein the time to reconnect is based upon the number of calls holding, the number of calls given reconnect priorities and the average time for each call.

6. The method of prioritizing incoming calls according to claim 1 wherein the caller is supplied with a new telephone number to be used to reconnect the call at a latter time.

7. The method of prioritizing incoming calls according to claim 2 wherein the queue is for voice contact with the receiving party.

8. The method of prioritizing incoming calls accordingly to claim 7 wherein information supplied by the caller is automatically transmitted to the receiving party.

9. The method of prioritizing incoming calls according to claim 8 wherein information from the caller is automatically transmitted to the receiving party at the time the caller is about to be placed in voice contact.

10. The method of prioritizing incoming calls according to claim 2 wherein during the period the caller is in communication connection with the receiving party prior to voice contact with the receiving party, the caller receives information.

11. The method of prioritizing incoming calls according to claim 2 wherein when the caller reconnects, the caller is given information as to the wait time and the option of holding or reconnecting at a latter time.

12. The method of prioritizing incoming calls according to claim 10 wherein when the projected hold time is greater than a set amount, the caller is not given the option of holding.

13. The method of prioritizing incoming calls and arranging for such incoming calls to be connected to a receiving party for voice contact at a later time, consisting of the steps of:
   a. the caller temporarily establishing a communication connection with the receiving party;
   b. automatically establishing a priority code;
   c. automatically establishing a place on the queue of incoming callers based on the priority code;
   d. automatically establish a time to reconnect;
   e. forwarding to the caller said established time to reconnect;
   f. breaking the communication connection; and
   g. automatically reminding the caller of the time for the caller to initiate reconnection to the receiving party.

14. The method of prioritizing incoming calls according to claim 13 wherein the caller calls back and is reconnected at the time established for reconnection and is placed in proper position in queue based on the caller's priority code.

15. The method of claim 14 wherein the caller is automatically reconnected and is automatically placed in position in the queue.

* * * * *